(12) United States Patent  
Weber et al.

(10) Patent No.: US 8,464,992 B2
(45) Date of Patent: Jun. 18, 2013

(54) TILT CONTROL FOR TILTABLE MOUNT

(75) Inventors: Frank Dean Weber, San Diego, CA (US); Erich Coiner, Poway, CA (US)

(73) Assignee: CareFusion 303, Inc., San Diego, CA (US)

( * ) Notice: Subject to any disclaimer, the term of this patent is extended or adjusted under 35 U.S.C. 154(b) by 467 days.

(21) Appl. No.: 12/326,044

(22) Filed: Dec. 1, 2008

(65) Prior Publication Data

US 2009/0189041 A1 Jul. 30, 2009

Related U.S. Application Data

(60) Provisional application No. 60/991,095, filed on Nov. 29, 2007.

(51) Int. Cl.
*E04G 3/00* (2006.01)

(52) U.S. Cl.
USPC ......... 248/371; 248/917; 16/342; 361/679.06

(58) Field of Classification Search
USPC ................. 248/371, 917, 918, 920, 921, 922, 248/923; 16/308, 319, 342, 343; 361/679.01, 361/679.06, 679.07, 679.21, 679.28
See application file for complete search history.

(56) References Cited

U.S. PATENT DOCUMENTS

| | | | | |
|---|---|---|---|---|
| 6,145,797 A | * | 11/2000 | Uehara | 248/291.1 |
| 6,532,628 B2 | * | 3/2003 | Kim | 16/342 |
| 6,698,063 B2 | * | 3/2004 | Kim et al. | 16/337 |
| 6,772,983 B1 | * | 8/2004 | Liao et al. | 248/291.1 |
| 7,404,234 B2 | * | 7/2008 | Lee et al. | 16/322 |
| 7,421,762 B2 | * | 9/2008 | Lu et al. | 16/328 |
| 7,610,658 B2 | * | 11/2009 | Lee et al. | 16/367 |
| 7,673,844 B2 | * | 3/2010 | Zhang et al. | 248/372.1 |
| 2007/0163081 A1 | * | 7/2007 | Lu et al. | 16/330 |

* cited by examiner

*Primary Examiner* — Terrell McKinnon
*Assistant Examiner* — Steven Marsh
(74) *Attorney, Agent, or Firm* — McDermott Will & Emery LLP

(57) ABSTRACT

A tilt control for a tiltable mount and a mount including a tilt control are provided. The mount has first and second brackets mounted for rotation or tilting, such as about a shaft. The second bracket might be a monitor mount tiltable relative to an arm bracket. The tilt control includes a friction brake and an over-running clutch configured to disengage the friction brake to permit upward rotation or tilting, but engage the friction brake for controlling the downward rotation or tilting. The friction brake is engaged by the over-running clutch to control downward tilting. The friction brake generates a counter-acting force to retain a mounted device such as a video monitor and/or keyboard in fixed position against drooping, but to permit downward tilting upon application by a user of an adjustment force.

13 Claims, 2 Drawing Sheets

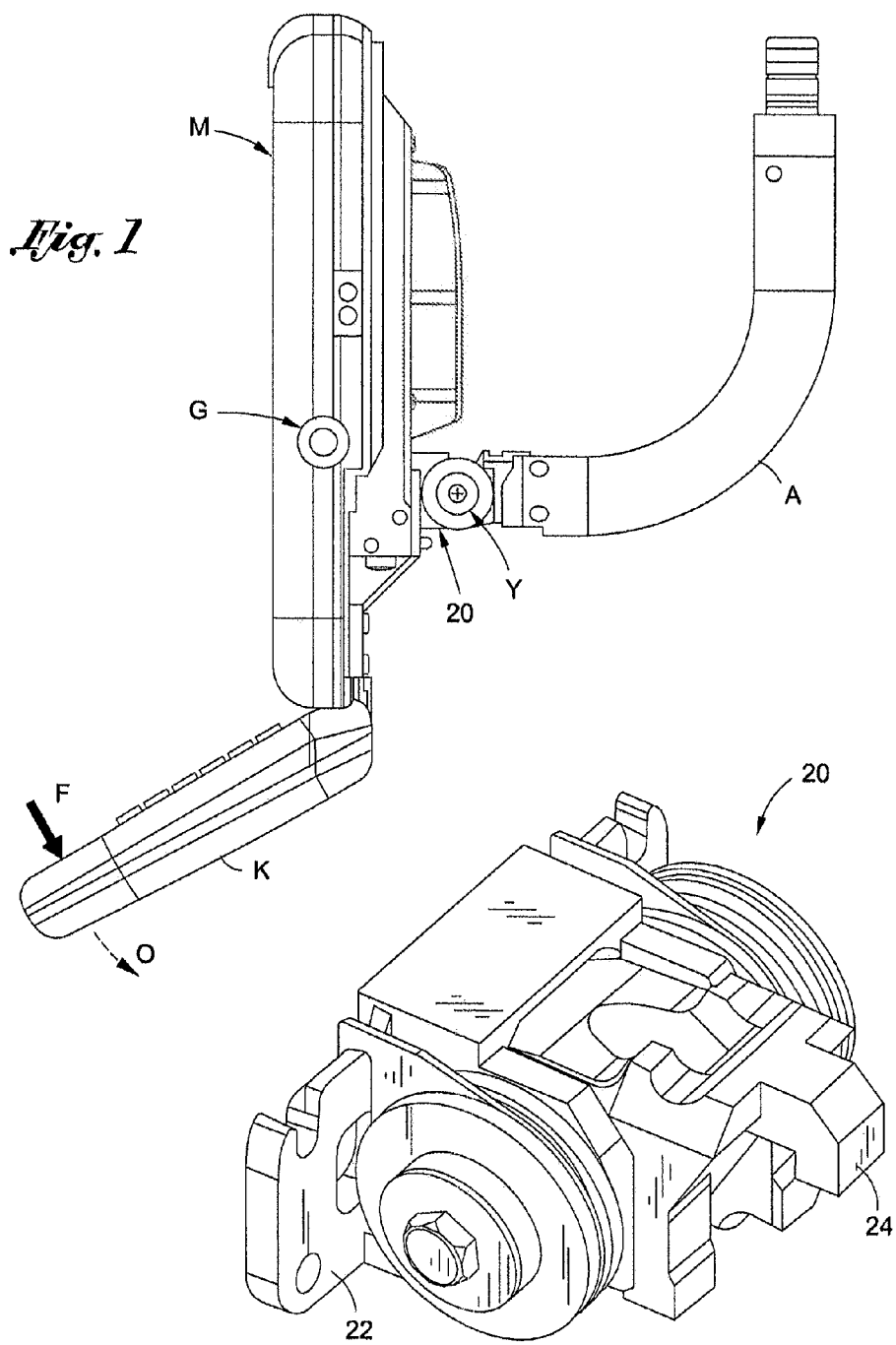

TILT CONTROL FOR TILTABLE MOUNT

RELATED APPLICATION DATA

This application claims priority to U.S. Provisional Application Ser. No. 60/991,095, filed Nov. 29, 2007.

FIELD OF THE INVENTION

The present invention relates to a tilt control mechanism for a tiltable mount.

BACKGROUND OF THE INVENTION

A variety of devices may be mounted for tilting movement. For example, a video display may be mounted for tilting movement to permit the viewing angle of the video display to be adjusted.

Unfortunately, current tilting mounts have a number of drawbacks. It is desired that such mounts both permit tilting, but also enable the device to be secured in the desired position. As one solution, a tiltable mount may be configured with a manual lock. This lock may be unlocked to permit the device to be tilted, and then re-engaged to lock the device in position once adjusted. These mechanisms are cumbersome and time consuming to use, because for even small adjustments the mechanism must be completely unlocked and then relocked.

In other situations, if the weight of the device is minimal, a simple friction-type device such as a rotatable knob that creates a compressive force can be used to limit movement of the mount. When a user applies sufficient pressure, the friction force is overcome, permitting the position of the device to be adjusted. Such a solution does not work, however, if the overhung weight moment of the device is very high, as then the friction force which is necessary to simply maintain the device in position is so high that it makes adjustment of the device difficult. In addition, such a device also then resists upward tilting. When the device is very heavy, the user must then overcome the weight of the device and the frictional force to tilt the device upwardly.

An improved tilt control mechanism is desired.

SUMMARY OF THE INVENTION

One aspect of the invention is a tiltable mount including a tilt control. Another embodiment of the invention comprises a tilt control for a rotating or tilting mount. The invention has utility to a tilting mount for a video monitor, for example.

In one embodiment a mount comprises a first bracket and a second bracket mounted for rotation relative to one another, such as about a shaft. The first bracket might comprise, for example, an arm bracket for connecting the mount to a mounting arm or a support. The second bracket might comprise a monitor mount, such as for mounting a video monitor and/or keyboard.

The tilt control is configured to control the rotational movement or "tilting" of the mount. In one embodiment, the tilt control limits or controls movement of the second bracket relative to the first bracket.

In one embodiment, the tilt control comprises a clutch and a friction brake. The clutch is configured to control rotation of the shaft. The clutch might comprise, for example, an over-running clutch mounted about the shaft. The clutch may be configured to generally permit upward rotation or tilting of the second bracket relative to the first bracket by permitting rotation of the shaft, but generally prevent rotation in the opposite direction.

The friction brake is preferably configured to control downward movement or tilting of the mount. In one embodiment the friction brake is mounted to the shaft and controls movement of the second bracket relative to the shaft. The friction brake may comprise one or more friction or braking elements configured to engage portions of the second bracket, such as brake plates thereof.

In operation, upward rotation of the mount is permitting by the disengaged clutch. At that time, the second bracket can be rotated or tilted upwardly by rotation thereof via the shaft relative to the first bracket. Such operation may permit, for example, a user to rotate or tilt a video monitor upwardly to adjust the position thereof.

During normal use, the second bracket is prevented from rotating or tilting downwardly (such as preventing drooping due to an overhung moment created by the offset weight of a video monitor) or a normal user force (such as typing on a keyboard) because of the engaged clutch and the friction brake. At the same time, the friction brake permits a user to rotate or tilt the second bracket downwardly upon application of an adjusting force (a force greater than the overhung moment and normal user force). In particular, such an adjusting force overcomes the braking force, permitting the second bracket to rotate relative to the first bracket.

Further objects, features, and advantages of the present invention over the prior art will become apparent from the detailed description of the drawings which follows, when considered with the attached figures.

BRIEF DESCRIPTION OF THE DRAWINGS

FIG. 1 illustrates a video display and associated keyboard mounted to an arm using a mount having an associated tilt control in accordance with an embodiment of the invention;

FIG. 2 is an isometric view of a tilt control and associated mount in accordance with a first embodiment of the invention;

DETAIL DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a tilt control for a tiltable mount, and a mount including a tilt control. In general, the tilt control is configured to control the tilting movement of a tiltable mount. In a preferred embodiment, the tilt control generally permits upward tilting, but limits or controls downward tilting of the mount.

FIG. 1 illustrates one application or environment of use for a tilt control of the present invention. As illustrated, a video display or monitor M and an associated keyboard K are mounted to an arm A via a tilt control 20. Of course, the tilt control 20 might be used with a mount which supports devices other than a monitor M and keyboard K. For example, the mount might support just a monitor M or entirely other devices. Also, the mount might be connected to other than an arm, such as other types of brackets or supports, or the mount might itself be directly connected to a support (such as a wall).

One embodiment of a tilt control 20 will be described with reference to FIGS. 2 and 3. As illustrated in FIG. 2, in one embodiment the tilt control 20 is associated with a mount comprising a monitor bracket 22 and associated arm bracket 24.

The monitor bracket 22 is configured to mount a monitor thereto. Of course, the configuration of the monitor bracket 22, including its size and shape, may depend upon the type of monitor. Further, the monitor bracket 22 may comprise other types of brackets in those instances in which other devices are configured to be mounted for tilting movement.

Likewise, the arm bracket 24 is configured for connecting to a support arm. Once again, the configuration of this bracket 24 may depend upon the particular arm or other mount or support to which the tilting mount is to be connected. For example, if the arm bracket 24 is configured to be directly mounted to a support, the arm bracket 24 might comprise a plate having apertures through which threaded fasteners may be passed.

Importantly, the monitor bracket 22 is configured for rotating movement relative to the arm bracket 24. Preferably, when installed, this mounting permits the monitor bracket 22 to move about a horizontal axis in a tilting movement (i.e. in a "yaw" movement about a yaw axis Y) up and down (as opposed to in and out or side to side), as illustrated in FIG. 1.

Figure 3:
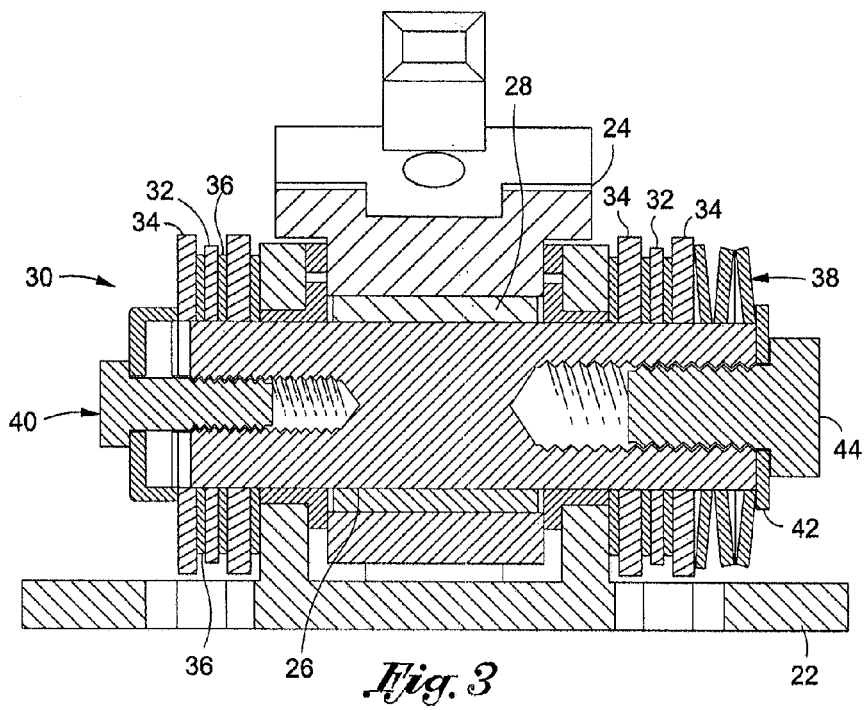
FIG. 3 is a sectional view of the tilt control and associated mount illustrated in FIG. 1.

Referring to FIG. 3, in one embodiment the monitor bracket 22 and arm bracket 24 are mounted for rotational (tilting) movement via a shaft 26. In accordance with the invention, the tilt control 20 is configured to control the relative movement of the monitor bracket 22 and arm bracket 24. In one embodiment, the monitor bracket 22 is mounted to the shaft 26 for rotation therewith and rotation relative thereto.

In one embodiment, the tilt control 20 comprises means for permitting upward tilting of the mount and means for limiting or controlling downward tilting of the mount. In one embodiment, the means comprise a clutch 28 and a friction brake 30. In one embodiment, the clutch 28 generally permits free upward rotation or tilting of the mount. The friction brake 30 controls downward rotation or tilting of the mount.

The clutch 28 is associated with the shaft 26 and is configured to generally permit the monitor bracket 22 to rotate or tilt upwardly relative to the arm bracket 24, but to prevent downward tilting. In one embodiment, the clutch 28 is an over-running clutch such as of the Sprague or drawn cup and roller variety. This type of clutch engages the shaft 26 when the shaft rotates in one (the down) direction, but not a second (the up) direction. In this manner, the clutch 28 permits the monitor bracket 22 to rotate or tilt upwardly via rotation of the shaft 26, but limits rotations of the shaft in the opposing direction, generally preventing downward rotation or tilting thereof by rotation of the shaft The monitor bracket 22 is also mounted to move relative to the shaft 26, so as to permit the monitor bracket 22 to rotate or tilt downwardly when the clutch 28 is engaged. However, the friction brake 30 is configured to generate a counter-force or moment against downward tilting of the mount. As illustrated in FIG. 1, when the monitor M and keyboard K are mounted to the arm A, the center of gravity G thereof is offset from the mount. Thus, there is an overhung moment O that, if not counteracted, tends to cause the monitor M and keyboard K to droop or tilt downwardly (until either the center of gravity G is aligned vertically with the mount or until downward movement of thereof is limited, such as by a stop of the mount).

This effect is increased if a user force F is also applied, such as during use of the keyboard K. The friction brake 30 is configured to counteract the overhung moment O and a normal user force F to maintain the monitor M and keyboard K in a particular raised position.

In one embodiment, the shaft 26 extends through the monitor bracket 22 and arm bracket 24 so as to have exposed ends. The friction brake 30 is associated with the shaft and its exposed end or ends. In a preferred embodiment, the friction brake 30 comprises one or more friction elements configured to resist downward tilting or rotation of the monitor bracket 22. Referring to FIG. 3, in one embodiment, one or more brake plates 32 are mounted for rotation with the monitor bracket 22. The brake plates 32 extend around the shaft 26. In one embodiment, there are a pair of brake plates 32, one brake plate 32 located at each end of the shaft 26.

In addition, one or more D-washers 34 or other braking members are mounted around the shaft 26. The shaft 26 engages the D-washers 34 through flats (not visible) to hold them stationary relative to the arm bracket 22. In one embodiment, four D-washers 34 are provided, two at each end of the shaft 26. The two D-washers 34 at each end of the shaft 26 are located at opposing sides of the respective brake plates 32.

The friction elements are configured to engage the D-washers 34 and/or brake plates 32. In one embodiment, the friction elements comprise friction washers 36 mounted around the shaft 26. In a preferred embodiment, a friction washer 36 is located between each D-washer 34 and its corresponding friction plate 32, and the D-washers 34 and the monitor bracket 22. In this configuration, there are six (6) friction washers 36. In this configuration, the friction washers 36 engage either the D-washers 34 or the brake plates 32, or both. This engagement resists the downward forces of the overhung moment O and user force so as to prevent the mounting bracket 24 from rotating or tilting downwardly.

In a preferred embodiment, the force generated by the friction brake 30 can be adjusted. As illustrated a load spring 38 is located at one end of the shaft 26. The load spring 38 may be a coil spring which is located over the shaft 26 and maintained in place by a stop 42 secured by a bolt or screw 44. The load or force applied by the load spring 38 may be adjusted, such as via an adjustment screw 40. In particular, as the adjustment screw 40 is moved in or out, it compresses or decompresses the load spring 38, thus increasing or decreasing the force applied to the friction brake 20. As the force increases, the friction force between the friction washers 36 and the D washers 34 and/or brake plates 32 increases, thus increasing the tilt-resisting frictional force.

In operation, the friction adjustment screw 40 is adjusted so that the counter-acting friction force generated by the friction brake 30 serves to maintain the monitor or other device(s) in the desired position against their overhung moment O and normal user force F. At the same time, this adjustment is preferably selected so that by applying a moving force (i.e. a very high downward user force greater than a normal use force), the monitor or other device(s) can be tilted downwardly. In particular, the friction force of the friction brake 30 can be overcome by applying sufficient force to rotate the monitor bracket 22 downwardly relative to the arm bracket 24.

On the other hand, if a user desires to raise (i.e. tilt up) the monitor or other device(s), the clutch 28 allows such movement (the friction brake 30 is effectively disengaged). This allows a user to freely tilt the monitor or device upwardly, at which point it is prevented from undesirable downward movement, such as drooping, because of engagement of the clutch 28 and the friction brake 30.

Of course the tilt control of the invention may have various configurations. For example, the friction brake might have other configurations. Instead of having multiple D-washers and/or brake plates, there might be as few as one or more friction washers (for example, a single friction washer might be configured to engage the monitor bracket). In other embodiments, other numbers of brake plates might be used, such as one brake plate or multiple pairs of brake plates.

It will be appreciated that the tilt control may be applied to other types of mounts. In one embodiment, the tilt control is preferably utilized with a monitor bracket and an arm bracket, but the tilt control could be utilized with other first and second brackets or mounts.

In addition, other types of brakes or resistive force generating elements might be utilized other than the friction brake detailed herein. Such mechanisms might include elements other than friction washers, such as friction pads or other elements.

In one embodiment, the clutch and friction brake are mounted in series, but they might be arranged in other configurations. Further, other implementations of clutches and friction brakes might be utilized. For example, such a configuration might include the use of a wrapped-spring or a ratchet as the over-running clutch.

Figure 4:
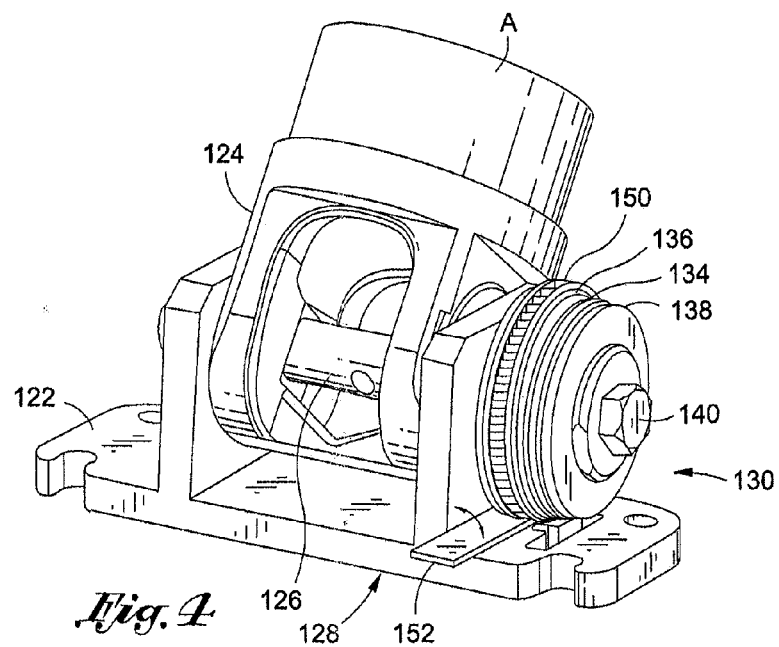
FIG. 4 is an isometric view of a tilt control and associated mount in accordance with a second embodiment of the invention.

FIG. 4 illustrates one such alternate embodiment tilt control 120 in accordance with the invention (wherein like elements have been given like reference numbers to those illustrated in FIGS. 1-3, except with a "100s" series designation). For example, in the embodiment illustrated in FIG. 3, the clutch 28 is located between the shaft 26 and the arm bracket 22. However, as illustrated in FIG. 4, the shaft 226 could be rigidly fixed to the arm bracket 124 with the clutch 128 could work between the shaft 126 and the friction brake 130. In this embodiment, a ratchet wheel 150 is linked to the monitor bracket 122 through a pawl 152 when the monitor bracket 122 is rotated or tilted downwardly (but permitting upward rotation or tilting). In configuration, the friction brake 130 comprises one or more friction washers 136 compressed between the ratchet wheel 150 and the D-washer 134. Once again, a spring 138 may be utilized to control the friction force, including, by an adjustment screw 140.

It will thus be appreciated that the invention comprises both a mount including a tilt control, and may comprise a tilt control for association with a tiltable mount. For example, a mount might be retrofit to include a tilt control of the invention, such as by adding a clutch and friction brake operable as detailed herein.

The invention has a number of advantages. First, a tilt control is provided which is easy to use. The tilt control does not require a user to lock and unlock the tilt mechanism in order to adjust the angle of the mount. To the contrary, the tilt control is automatic. Most importantly, the tilt control resists downward drooping or tilting. However, the tilt control still permits a user to electively tilt a device downwardly by applying an adjustment force. At the same time, the tilt control permits upward tilting of a device. Preferably, upward tilting or movement is freely permitted (wherein the friction brake is not effective and the force necessary to tilt upwardly does not need to overcome the friction brake force).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An adjustable mount comprising:
a mount comprising:
a first bracket;
a second bracket; and
a shaft coupled between said first bracket and said second bracket, said shaft configured to permit said brackets to be rotated relative to one another about said shaft in a tilt up direction and a tilt down direction; and
a tilt control associated with said mount, said tilt control comprising:
a friction brake coupled between said first and second brackets, said friction brake configured to resist rotation of said first and second brackets relative to one another; and
a clutch mechanism coupled between said first bracket and said friction brake, said clutch mechanism comprising an overrunning clutch mounted about said shaft, said clutch mechanism configured to permit rotation of said first bracket relative to said friction brake in said tilt up direction and to resist rotation of said first bracket relative to said friction brake in said tilt down direction.

2. The adjustable mount of claim 1, wherein said first bracket comprises an arm mount.

3. The adjustable mount of claim 1, wherein said second bracket comprises a video monitor mount.

4. The adjustable mount of claim 1, wherein said clutch mechanism is coupled between said shaft and said first bracket and said friction brake is coupled between said shaft and said second bracket.

5. The adjustable mount of claim 4, wherein said friction brake comprises at least one friction element engaging at least a portion of said second bracket.

6. The adjustable mount of claim 5, wherein said second bracket comprises one or more brake plates and said at least one friction element engages at least one of said brake plates.

7. The adjustable mount of claim 1, wherein said friction brake is mounted to said shaft.

8. The adjustable mount of claim 1, wherein said friction brake comprises a plurality of friction washers.

9. The adjustable mount of claim 1, wherein said friction brake comprises means for adjusting a friction braking force generated by said friction brake.

10. The adjustable mount of claim 9, wherein said means for adjusting comprises at least one spring configured to generate a compressive force against a braking member of said friction brake.

11. The adjustable mount of claim 10, further comprising at least one adjusting screw configured to selectively compress said at least one spring.

12. An adjustment mechanism comprising:
a first bracket;
a clutch means comprising a first part and a second part, said first part coupled to said first bracket, said clutch means configured to permit rotation of said second part relative to said first part in a first direction but not in a second direction that is opposite to said first direction;
a friction means comprising a third part and a fourth part, said third part coupled to said second part of said clutch means, said friction means configured to adjustably resist rotation of said third part relative to said fourth part; and
a second bracket coupled to said fourth part of said friction means wherein:

said clutch means and said friction means are arranged about a common axis;

said second part rotates about said common axis relative to said first part;

said fourth part rotates about said common axis relative to said third part;

said friction means can be adjusted to provide a first amount of resistance to rotation of said fourth part relative to said third part within a range; and said clutch means permits rotation of said second part with respect said first part with a second amount of resistance that is less than said range of said first amount of resistance of said friction means.

13. The adjustment mechanism of claim 12, wherein:

when said second bracket is urged to rotate in said first direction relative to said first bracket, said second part rotates with respect to said first part and said fourth part remains stationary with respect to said third part; and when said second bracket is urged to rotate in said second direction relative to said first bracket, said second part remains stationary with respect to said first part and said fourth part rotates with respect to said third part.

* * * * *